United States Patent [19]

Gallaway et al.

[11] Patent Number: 5,570,988
[45] Date of Patent: Nov. 5, 1996

[54] CART CARRYING DEVICE

[75] Inventors: Daniel G. Gallaway, Mishawaka; Jack N. Morrical, Granger, both of Ind.

[73] Assignee: Midway Truck & Coach, Inc., Elkhart, Ind.

[21] Appl. No.: 247,684

[22] Filed: May 23, 1994

[51] Int. Cl.$^6$ ........................................ B60P 3/40
[52] U.S. Cl. ........................ 414/498; 414/343; 414/401
[58] Field of Search ................. 414/340, 341, 414/343, 345, 347, 498, 401, 584, 522; 280/293, 35, 639, 767, 763.1

[56] References Cited

U.S. PATENT DOCUMENTS

| | | | |
|---|---|---|---|
| 1,640,263 | 8/1927 | Burgett | 414/341 X |
| 2,856,085 | 10/1958 | Ryan | 414/343 X |
| 3,722,721 | 3/1973 | Bennett | 414/498 |
| 4,190,280 | 2/1980 | Donohoe | 280/767 X |
| 4,231,695 | 11/1980 | Weston, Sr. | 414/498 X |
| 4,685,857 | 8/1987 | Goeser et al. | 414/522 |
| 5,090,335 | 2/1992 | Russell | 414/498 X |
| 5,360,307 | 11/1994 | Schemm et al. | 414/401 X |
| 5,387,063 | 2/1995 | Napierkowski et al. | 414/401 X |

FOREIGN PATENT DOCUMENTS

| | | | |
|---|---|---|---|
| 163780 | 5/1921 | United Kingdom | 414/340 |
| 927014 | 5/1963 | United Kingdom | 280/35 |
| 7900314 | 6/1979 | WIPO | 280/639 |

OTHER PUBLICATIONS

Brochure entitled "Fold–a–Cart" by Norris Food Transport Equipment, Division of Accurate Metal Products, Inc., dated Oct. 1986.

*Primary Examiner*—David A. Bucci
*Attorney, Agent, or Firm*—Baker & Daniels

[57] ABSTRACT

The invention is directed to a device for transporting cargo, and adapted to receive and convey the cargo to and from a storage area. The device includes a cart having a frame and two rails mounted to a top of the frame. The rails are disposed in spaced apart, parallel relationship to each other and define a longitudinal direction. A table includes two rail channels disposed at a bottom side thereof. The rail channels are disposed in spaced apart, parallel relationship to each other for respectively receiving each of the two cart rails therein. The table further includes a plurality of rollers disposed in each of the rail channels. The rollers are rotatably disposed between the table and the cart rails for allowing relative movement between the table and the cart in the longitudinal direction.

3 Claims, 6 Drawing Sheets

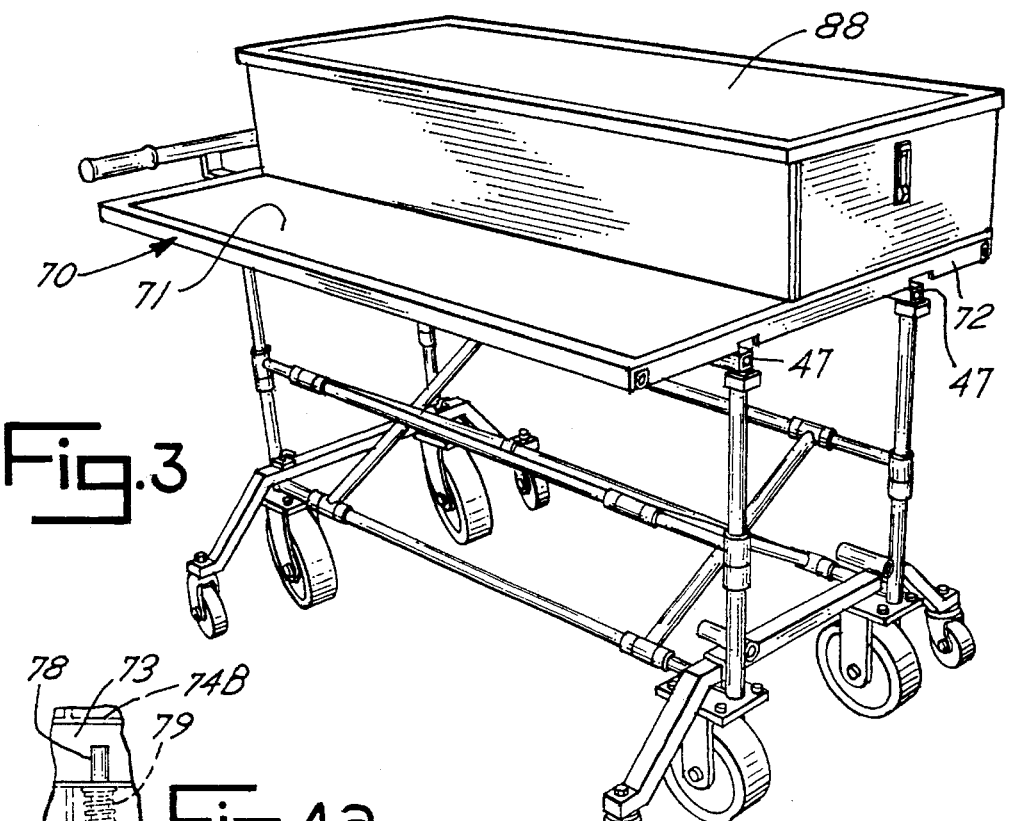
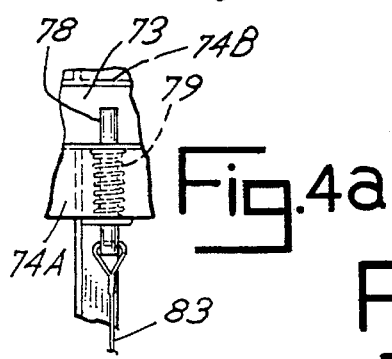
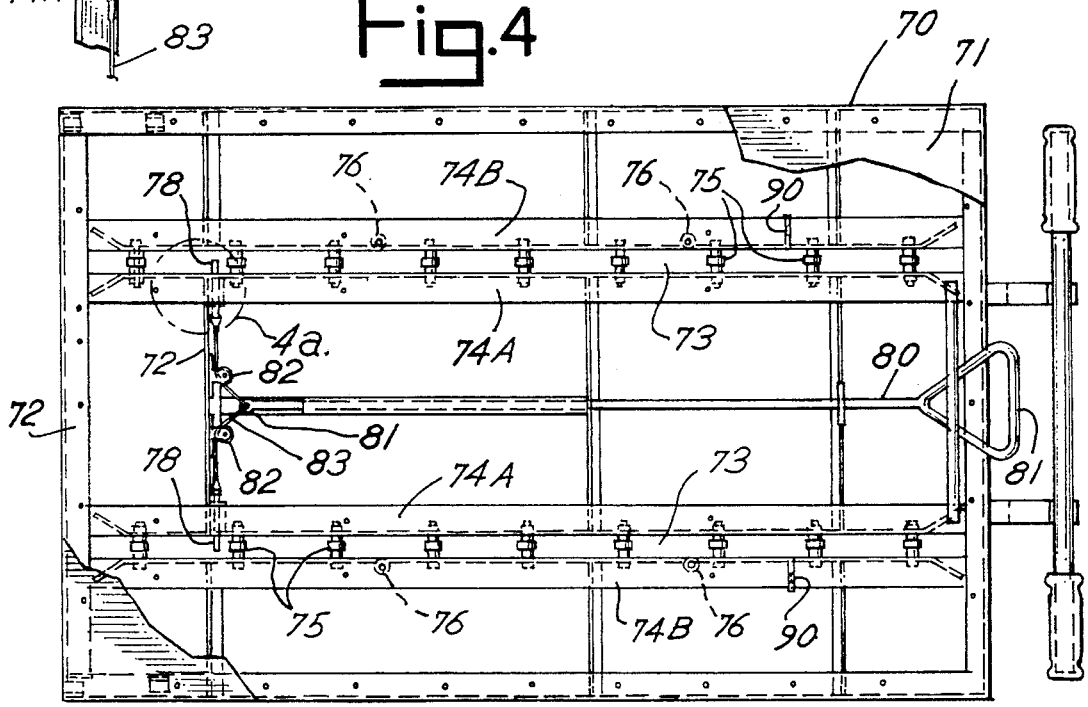

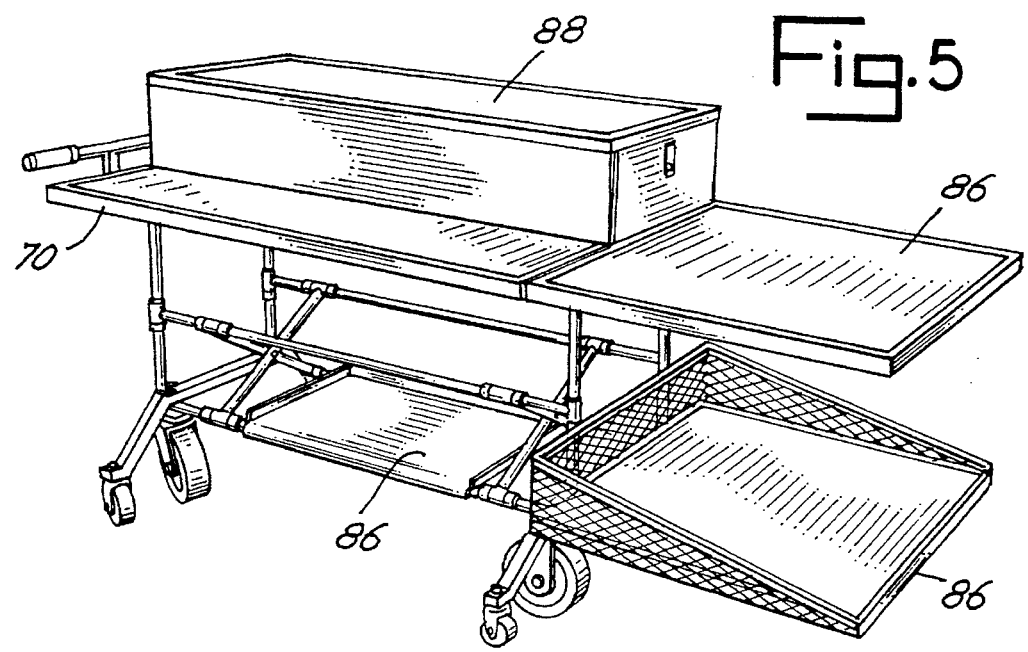
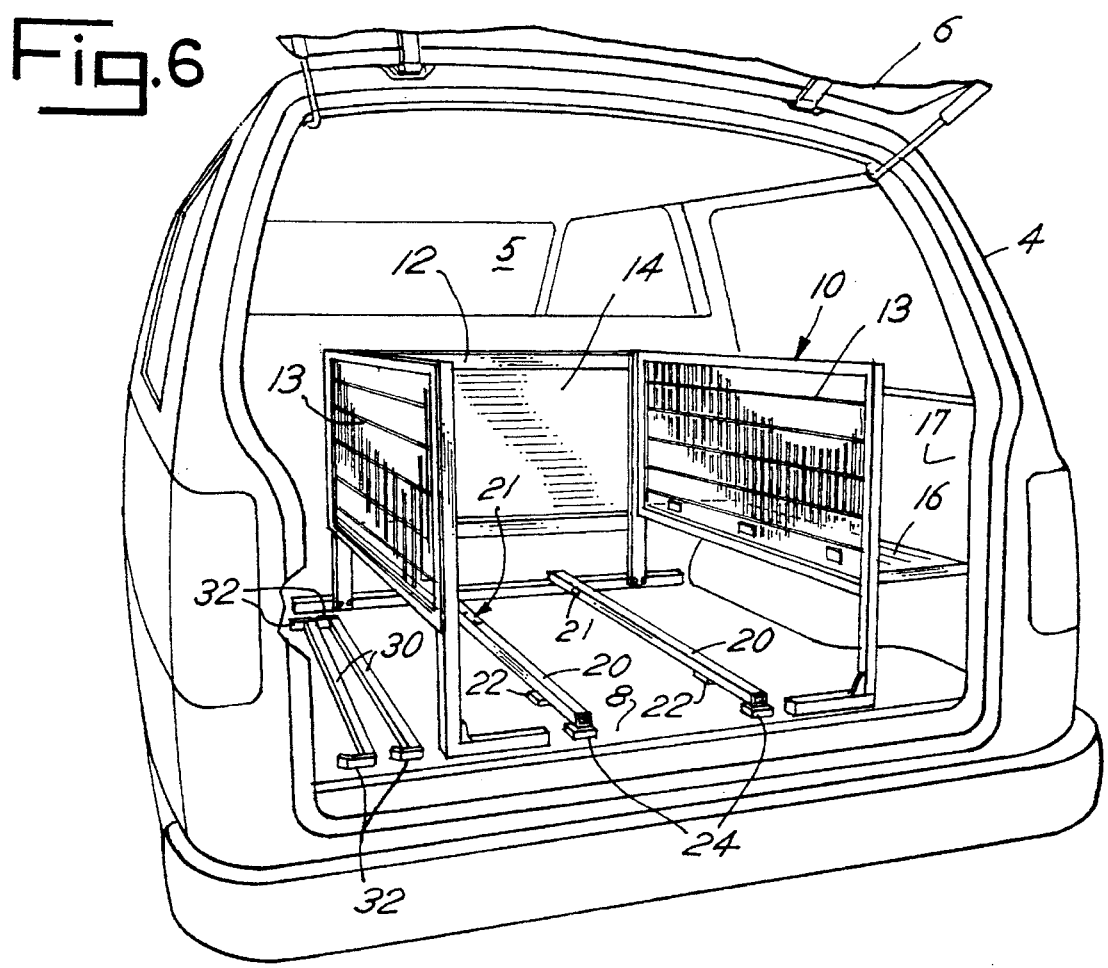

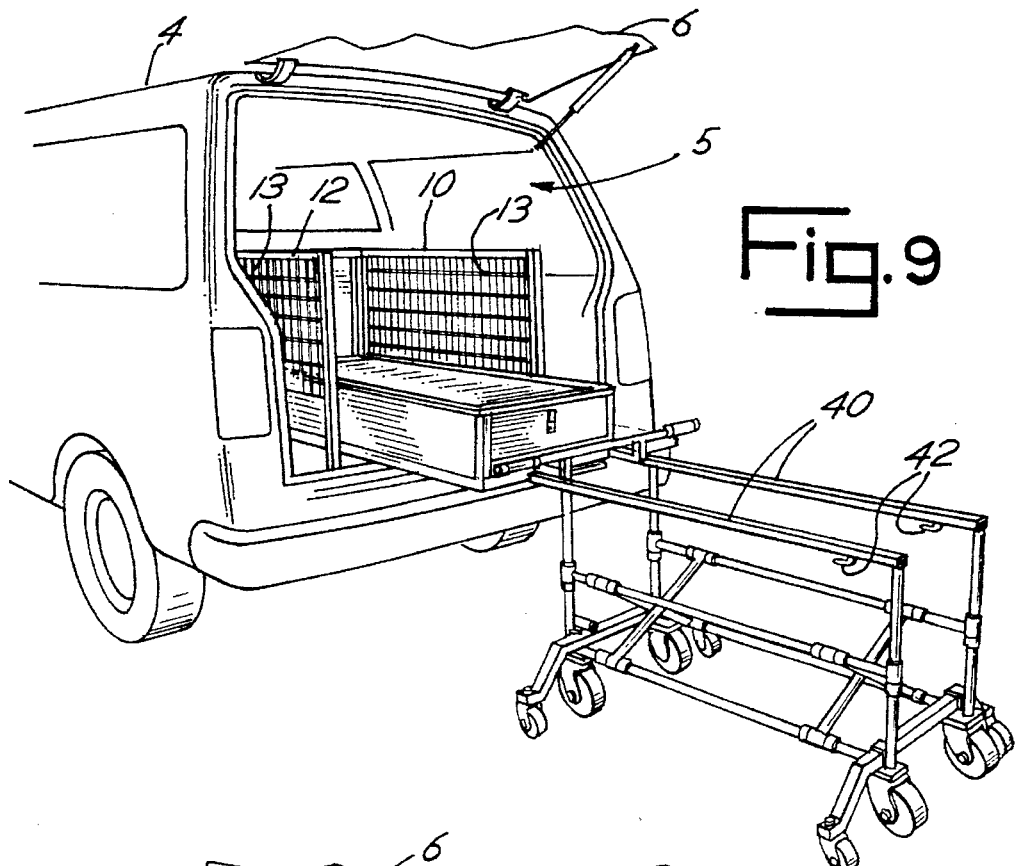
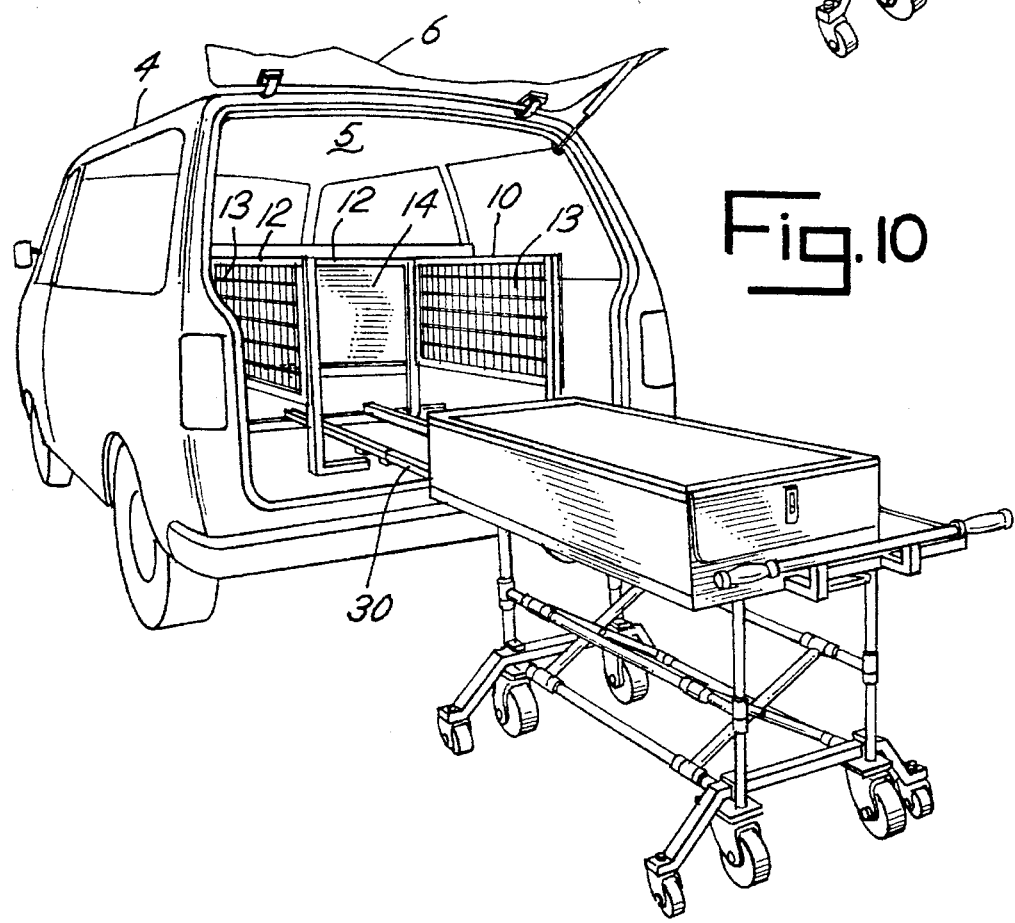

CART CARRYING DEVICE

BACKGROUND OF THE INVENTION

1. Field of the Invention

The present invention relates to a device for safely transferring cargo and equipment from the cargo area of a transport vehicle to a folding transport cart without manually lifting or handling the cargo or equipment.

2. Description of the Related Art

Transferring cargo, such as electronic lab equipment, from a transport vehicle to handcarts and other similar devices typically involves manually lifting and handling of the cargo. The transport vehicle generally has a cargo area that is elevated above the ground. Consequently, the cargo must be elevated in order to be placed in the cargo area of the transport vehicle. Often the cargo is too bulky and heavy to be moved manually by a single person without additional human or mechanical assistance. Many physical injuries result from attempting to load and unload bulky cargo in and out of the cargo area of a conventional transport vehicle by lifting and moving the same. In addition, the potential for damaging the cargo increases with the loading and unloading difficulties.

A device such as a conventional gurney may be used to load, unload and transport the cargo, particularly in the medical services field. Conventional gurneys use a variety of mechanically folding lower frames to allow the gurney to ride directly into the cargo area of the transport vehicle and thereby eliminate any lifting on the part of the users. Conventional gurneys are not designed, however, to accommodate the weight of modern electronic lab equipment. Over loading a gurney can tip the gurney resulting in damage to the equipment. Even for medical use, a heavy human body can require multiple people to help lift and steady the gurney.

SUMMARY OF THE INVENTION

The cart carrying device (CCD) of this invention eliminates many of the handling problems associated with transferring cargo between a transport vehicle and a handcart. The CCD allows cargo to be transferred directly to and from a folding push cart without manually lifting the cargo.

The CCD contained within the cargo area of the transport vehicle is carried on a shiftable platform which is housed within a transport cage and rides on a set of detachable rails between the transport cage and a folding push cart. The cart can be folded into a transport position and stored within the vehicle's cargo area adjacent the transport cage. The transportation cage stores and protects the CCD, cart and cargo during transportation. To unload the cargo, the folding push cart is removed and assembled, the extension rails are connected between the transportation cage and the push cart, and the platform is unlocked and manually pulled onto the cart. The platform is then locked into position on the push cart and the extension rails are removed. With the equipment seated atop the platform, the user can load and unload the platform without manually lifting the heavy equipment. Consequently, the risk of personal injury and damage to the equipment is substantially reduced.

The invention includes, in one form thereof, a device for transporting cargo, and adapted to receive and convey the cargo to and from a storage area. The device includes a cart having a frame and two rails mounted to a top of the frame. The rails are disposed in spaced apart, parallel relationship to each other and define a longitudinal direction. A table includes two rail channels disposed at a bottom side thereof. The rail channels are disposed in spaced apart, parallel relationship to each other for respectively receiving each of the two cart rails therein. The table further includes a plurality of rollers disposed in each of the rail channels. The rollers are rotatably disposed between the table and the cart rails for allowing relative movement between the table and the cart in the longitudinal direction.

An advantage of the present invention is that cargo may be transferred directly to and from a cargo area of a transport vehicle upon a push cart without manually lifting the cargo.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 3 is a perspective view of the push cart with a platform and cargo thereon;

FIG. 4 is a fragmentary top plan view of the push cart and platform shown in FIG. 3;

FIG. 4a is a detailed view of area 4a of FIG. 4, showing part of the table lock mechanism;

FIG. 5 is a perspective view of the push cart platform and cargo shown in FIG. 3, with various shelf accessories attached thereto;

FIG. 6 is rear perspective view of an empty cargo area of a vehicle with an embodiment of a protective cage and interior rails of the present invention installed therein;

FIG. 9 is a rear perspective view of the CCD, with the platform shifted onto the extension rails;

FIG. 10 is a rear perspective view of the CCD, with the platform shifted onto the push cart.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

The preferred embodiment herein described is not intended to be exhaustive or to limit the invention to the precise form disclosed. It is chosen and described to explain the principles of the invention and its application and practical use to enable others skilled in the art to utilize its teachings.

FIGS. 1–10 illustrate the cart carrying device (CCD) 2 of this invention. CCD 2 is adapted for use with any conventional vehicle such as van, panel truck or ambulance. CCD 2 includes a transport cage 10; a folding transport cart 50; shiftable platform 70; and extension rails 30.

Figure 1:
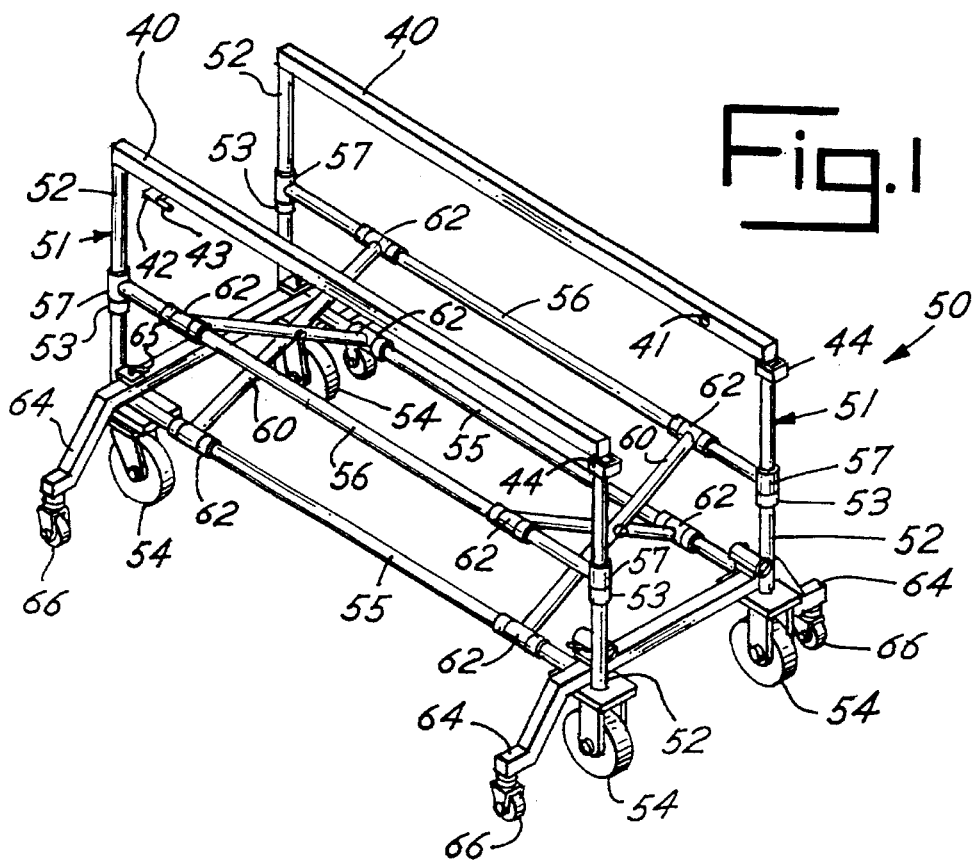
FIG. 1 is a perspective view of an embodiment of the push cart of the present invention.
Figure 2:
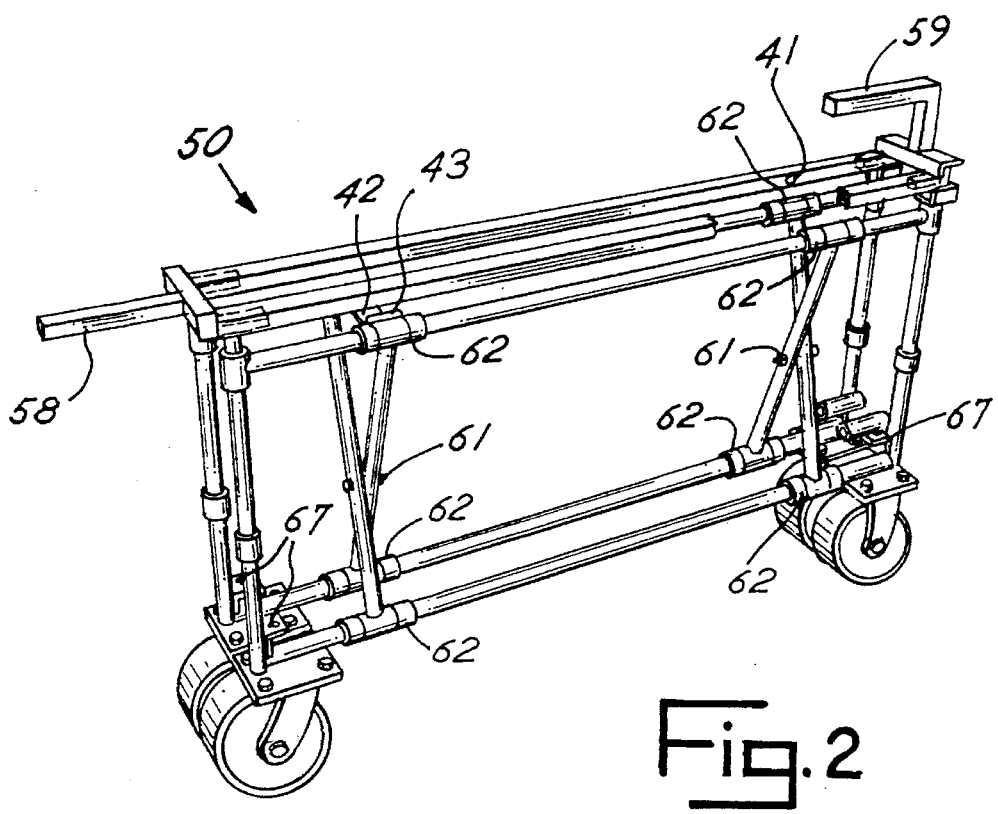
FIG. 2 is a perspective view of the push cart with carrying handles attached thereto, shown in a collapsed portage and storage position of FIG. 1.

FIGS. 1 and 2 show the basic construction of folding transport cart 50. Cart 50 includes two identical side parts 51 connected by two sets of scissored cross members 60. Each side part 51 include a pair of vertical uprights 52 connected by a lower side member 55 and a shiftable upper side member 56. Uprights 52 extend through sleeve 57 mounted at each end of upper side member 56 for shiftable movement along the length of uprights 52 between an upper end (not numbered) of upright 52 and an annular stop ring 53. A caster wheel assembly 54 is mounted to the lower end of each upright 52. Each caster assembly 54 includes a wheel lock (not shown) so that a user can retard the movement of the wheels when needed.

Tubular cart rails 40 are mounted across the tops of uprights 52 of each side part 51. Preferably, cart rails 40 have a rectangular cross section and open ends 47, as shown in FIGS. 1–3 and 11. Each cart rail 40 has a lock hole 41. At the forward end of cart 50, each upright 52 includes a rail coupling 44 disposed adjacent a cart rail 40. Each cart rail 40 also includes a stop bracket 42 and guide shank 43, which limit the travel of platform 70 onto transport cart 50, which will be described in detail subsequently herein.

Scissored cross members 60 are connected at their center by pivot pin 61. Each cross member 60 is pivotally connected at one end to a lower side member 55 of one side part 51 and at the other end to intermediate cross member 56 of the opposite side part 51. A tubular sleeve 62 is connected at each end of cross member 60. The lower side members 55 and upper side members 56 are journalled inside sleeves 62. The pivotal connection between cross members 60 and side members 55, 56 allows transport cart 50 to be collapsed or folded to a transport/storage position as shown in FIG. 2. In the transport position, side parts 51 are disposed closely adjacent to each other. FIG. 2 shows transport cart 50 in a collapsed or transport position with carrying handles 58, 59 removably attached to transport cart 50.

FIG. 1 shows transport cart 50 in an operational position with outriggers 64 mounted thereto. Outriggers 64 provide increased lateral stability of transport cart 50 during loading, unloading, transport, etc. A small caster wheel 66 is mounted to an outboard end of each outrigger 64. An outrigger bracket 67 is mounted to each upright 52. Each outrigger 64 is secured across each side part 51 by a pin 65 which extends through aligned holes in outrigger 64 and a respective outrigger bracket 67. For convenience, each pin 65 can be connected to a respective upright 52 by a length of cord or chain to provide ready access when attaching outriggers 64 and prevent loss of pins 65.

FIG. 4 shows the basic construction of shiftable platform 70. Platform 70 includes a substantially flat table 71 and a supporting frame 72. Table 71 is constructed of any suitable material, such as plywood, particle board or sheet metal. The upper surface of table 71 can be covered with a non-skid material or coating to prevent articles placed atop table 71 from shifting about. Frame 72 is preferably constructed of angle iron. Table 71 is mounted to frame 72 by conventional means, such as screws or bolts. Frame 72 supports two sets of spaced parallel rail guides, including an inside rail guide 74A and an outside rail guide 74B. Rail guides 74A, 74B define a rail channel 73. A plurality of vertical rollers 75 are rotatively mounted between rail guides 74A,B and two horizontal rollers 76 are carried by each outside rail guide 74B.

A lock release handle 80 including an eyelet 81 is supported by frame 72. Inside rail guides 74A each have a bore 77 (FIG. 11) with a latch pin 78 slidably disposed therein (FIG. 4a). Each latch pin 78 is biased by a spring 79 to extend partially into channel 73 between rail guides 74A, 74B.

Latch pins 78 are interconnected by a section of cable 83. Cable 83 passes around pulleys 82 mounted to frame 72 and through eyelet 81 of handle 80. When handle 80 is manually moved in a longitudinal direction away from platform 70, latch pins 78 are extracted from rail channel 73.

FIGS. 3 and 5 show transport cart 50 in combination with shiftable platform 70. As shown in FIG. 3 and 5, platform 70 can support a variety of cargo, such as storage container 88. For carrying additional cargo, transport cart 50 can be provided with one or more accessory shelves 86.

FIGS. 6–10 show transport cage 10 mounted inside cargo area 5 of van 4. Although CCD 2 is shown used with a van 4, CCD 2 can likewise be used with any type of vehicle, elevated storage cabinet or similar structure. Cargo area 5 is enclosed by a rear cargo door 6. Transport cage 10 is secured within cargo area 6 to prevent cargo which is carried by CCD 2 and transported within cargo area 5 from shifting during transportation. Transport cage 10 is preferably constructed of a heavy wire screen side walls 13 and back wall 14 which are secured to a tubular frame 12. Transport cage 10 may also include an auxiliary storage shelf 16 (FIGS. 6 and 7) mounted between one of cage side walls 13 and an adjacent side wall 17 of van 4. Shelf 16 provides additional storage area for various CCD components and equipment.

Two parallel cage rails 20 are secured to floor 8 of cargo area 5 as by screws or bolts. Rails 20 are disposed parallel to each other and extend toward rear cargo door 6. Each cargo rail 20 includes a stop bracket 22 with a guide shank 23 (FIG. 6) located near the rear of cargo area 5. A rail coupling 24 is mounted to floor 8 at the rear most end of each cargo rail 20. Cargo rails 20 also include oppositely located lock holes 21.

Tubular extension rails 30 (FIGS. 6–10) are preferably constructed of an elongated, rectangular metal tube. Each extension rail 30 includes a hooked member 32 attached at each end thereof (see FIG. 6). Hooked members 32 respectively fit into and engage a rail coupling 44 of transport cart 50 and a rail coupling 24 of transport cage 10.

Figure 7:
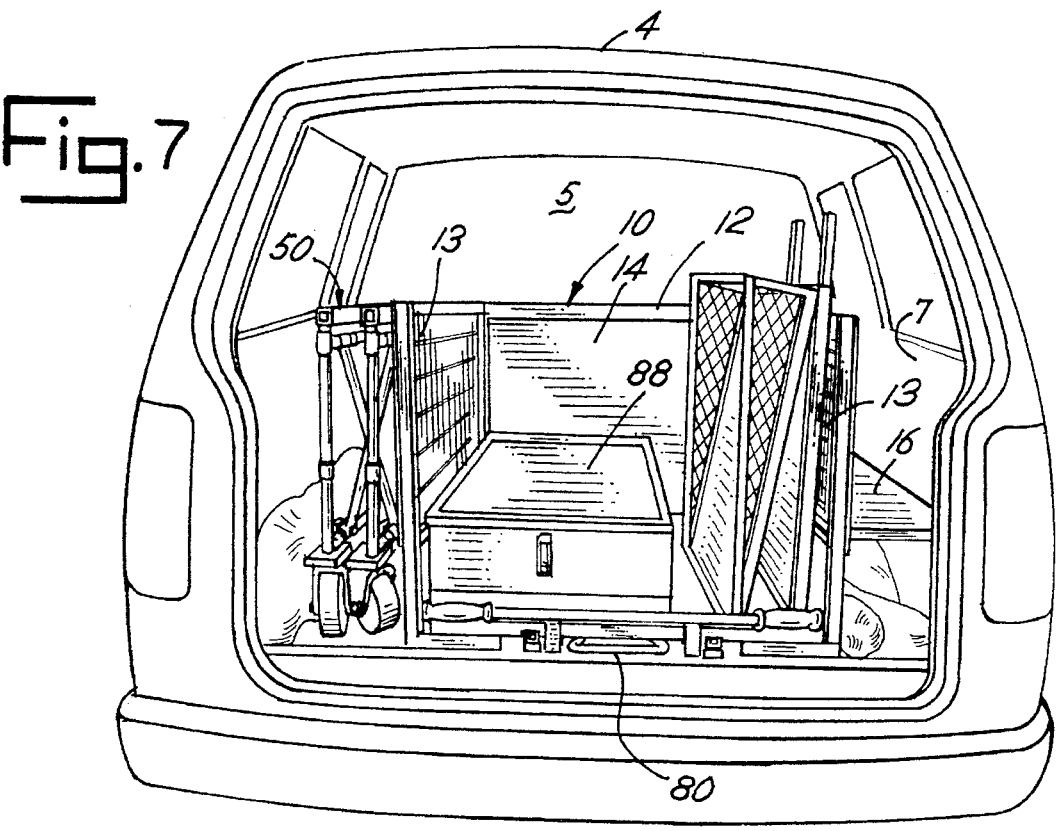
FIG. 7 is a rear view of the cargo area of FIG. 6 with the CCD of FIG. 5 therein.

Referring now to FIGS. 7–10, operation of CCD 2 will be more fully explained. For purposes of illustration, it is assumed that all of the various components of CCD 2 are stored in a transport position within cargo area 5, as shown in FIG. 7.

Figure 8:
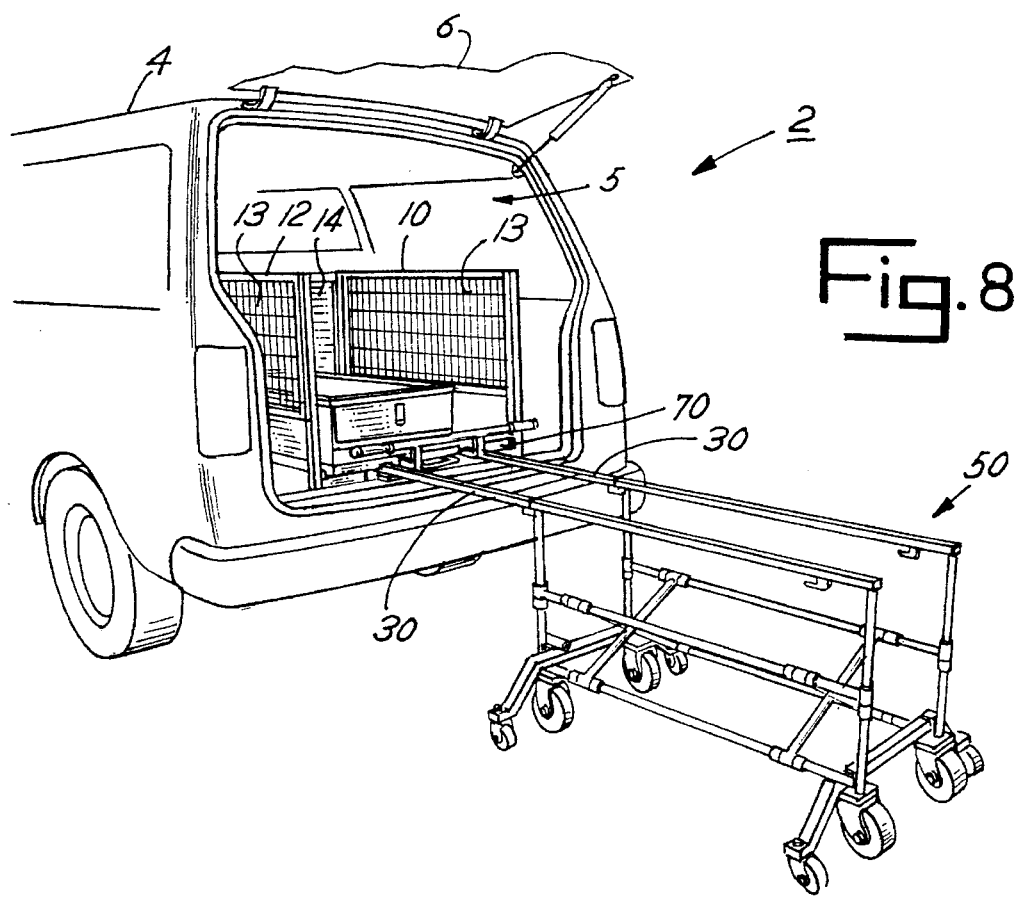
FIG. 8 is a rear left side perspective view of the push cart connected by extension rails to the cargo area.
Figure 11:
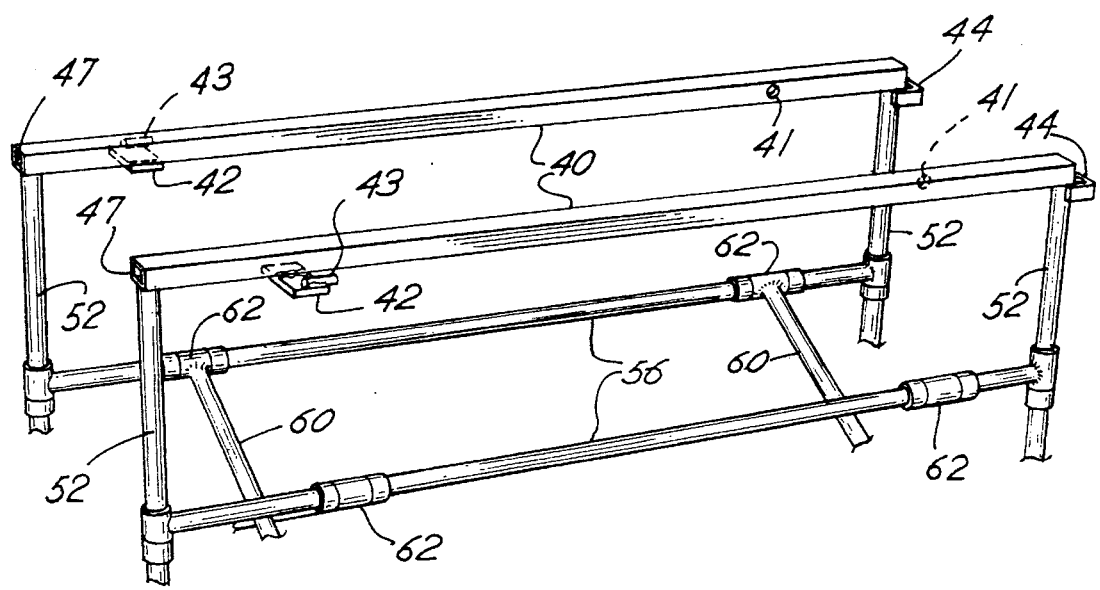
FIG. 11 is a fragmentary perspective view of the push cart showing in detail the securement parts for the platform.

First, transport cart 50 is removed from cargo area 5 and unfolded as shown in FIG. 8. Transport cart 50 is oriented relative to van 4 such that rail couplings 44 of transport cart 50 are disposed facing van 4. Outriggers 64 may be attached to transport cart 50 as described above.

Next, extension rails 30 are removed from cargo area 5 and connected at each end 32 thereof to transport cage 10 and folding transport cart 50, as shown in FIG. 8. More particularly, hooked members 32 of each extension rail 30 are respectively hooked or slid into rail couplings 44 of transport cart 50 and rail couplings 24 of transport cage 10. When in an installed position, the respective upper surfaces of cargo rails 20, extension rails 30 and cart rails 40 are disposed generally coplanar with each other; although it is possible for an obtuse angle to exist between extension rails 30 and either cargo rails 20 or cart rails 40.

Next, lock release handle 80 is pulled toward the rear of van 4, whereby latch pins 78 are withdrawn from holes 21 of cargo rails 20. Platform 70, with container 88 disposed thereon, can then be rolled onto extension rails 30 and cargo rails 40, as shown in FIGS. 9 and 10. As platform 70 is rolled out of van 4, guide shanks 23 become withdrawn from flanges 90 which are respectively attached to outside rail guides 74B seen in FIG. 4. Vertical rollers 75 connected to the bottom side of platform 70 and disposed within each rail channel 73 allow platform 70 to be relatively easily moved in a longitudinal direction of cargo rails 20, extension rails 30 and cart rails 40. As platform 70 is moved onto transport cart 50, as shown in FIG. 10, outwardly extending flanges 90 engage stop brackets 42 of the cart. More particularly, the openings formed in outwardly extending flanges 90 receive respective guide shanks 43 of stop brackets 42. When guide shanks 43 are disposed within the openings of outwardly extending flanges 90, latch pins 78, which are biased toward rail channel 73 by spring 79, snap into corresponding holes 41 formed in cart rails 40. Platform 70 is thus locked into place on transport cart 50. To move transport cart 50, platform 70 and container 88 to a location remote from van 4, extension rails 30 are simply lifted and detached at each end thereof from cargo rails 20 and cart rails 40. Extension rails 30 may then be placed in van 4, or carried with transport cart 50 to the remote location.

For ease of handling, the remote location preferably includes a pair of parallel, spaced rails similar to cargo rails 20 which may be connected with rails 40 of transport cart 50 by extension rails 30. With such structure, it is not necessary for a user to manually lift platform 70 and container 88, which likely includes equipment or the like therein.

To load cargo, such as container 88, into van 4, the steps described above with regard to unloading van 4 are simply reversed, as will be appreciated by those skilled in the art. Latch pins 78 of platform 70 snap into lock holes 21 of cargo rails 20 with platform flanges 90 engaging stop brackets 22 about shanks 23, whereby platform 70 is locked into place during movement of van 4.

The embodiment shown in FIGS. 1–10 illustrates a CCD 2 for carrying a storage container 88. However, it is to be understood that CCD 2 can be used for carrying other types of cargo, such as electronic lab equipment, human bodies, etc.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A device for transporting cargo, said device adapted to receive and convey the cargo to and from a storage area, respectively, said device comprising:

a cart including a frame and two rails mounted to a top of said frame, said rails disposed in spaced apart, parallel relationship to each other and defining a longitudinal direction, said cart further including a lock hole; and a table including two rail channels disposed at a bottom side thereof, said rail channels disposed in spaced apart, parallel relationship to each other for respectively receiving each of said two rails therein, a plurality of rollers disposed in each of said rail channels, said rollers rotatably disposed between said table and said cart rails for allowing relative movement between said table and said cart in said longitudinal direction, and a latch pin movable along an axis of said latch pin, said latch pin to be received by said cart lock hole;

one of said cart and said table further including a stop bracket with an opening therein; the other of said cart and said table further including a guide shank, said guide shank to be received by said stop bracket opening.

2. The device of claim 1, further comprising a pair of extension rails, each of said extension rails being connected at one end thereof to one of said cart rails and adapted at an opposite end thereof to engage with the storage area, thereby allowing said relative movement of said table into said storage area.

3. A device for transporting cargo, said device adapted to receive and convey the cargo to and from a storage area, respectively, said device comprising:

a cart including a frame and two rails mounted to a top of said frame, said rails disposed in spaced apart, parallel relationship to each other and defining a longitudinal direction; two extension rails, each said extension rail connected at one end thereof to a respective said cart rail and adapted at an opposite end thereof for supporting engagement with the storage area; a table including two rail channels disposed at a bottom side thereof, said rail channels disposed in spaced apart, parallel relationship to each other for respectively receiving each of said two rails therein; said table including a latch pin movable along an axis of said latch pin, said cart including a lock hole for receiving said latch pin, one of said cart and said table including a stop bracket with an opening therein, and an other of said cart and said table including a guide shank received within said stop bracket opening.

\* \* \* \* \*